(12) United States Patent
Nishiyama

(10) Patent No.: US 10,992,828 B2
(45) Date of Patent: Apr. 27, 2021

(54) IMAGE FORMING APPARATUS AND METHOD FOR CONTROLLING SETUP INFORMATION BASED ON A REFERENCE APPARATUS

(71) Applicant: KYOCERA Document Solutions Inc., Osaka (JP)

(72) Inventor: Masahiro Nishiyama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/918,967

(22) Filed: Jul. 1, 2020

(65) Prior Publication Data
US 2021/0014368 A1 Jan. 14, 2021

(30) Foreign Application Priority Data

Jul. 9, 2019 (JP) .............................. JP2019-127699

(51) Int. Cl.
*H04N 1/00* (2006.01)

(52) U.S. Cl.
CPC ..... *H04N 1/00395* (2013.01); *H04N 1/00411* (2013.01); *H04N 1/00413* (2013.01); *H04N 1/00514* (2013.01)

(58) Field of Classification Search
CPC ........... H04N 1/00395; H04N 1/00514; H04N 1/00413; H04N 1/00411
See application file for complete search history.

(56) References Cited

U.S. PATENT DOCUMENTS

| 9,338,315 B2 * | 5/2016 | Ohara | H04N 1/32704 |
| 2006/0098685 A1 | 5/2006 | Mase et al. | 370/467 |
| 2011/0102832 A1 * | 5/2011 | Iwashita | H04N 1/00413 358/1.15 |
| 2012/0198541 A1 * | 8/2012 | Reeves | H04L 63/1441 726/13 |
| 2013/0107307 A1 * | 5/2013 | Ozawa | H04N 1/00344 358/1.14 |
| 2019/0095151 A1 * | 3/2019 | Inoue | H04N 1/00464 |

FOREIGN PATENT DOCUMENTS

JP 2006-139422 A 6/2006

* cited by examiner

*Primary Examiner* — Juan M Guillermety
(74) *Attorney, Agent, or Firm* — Stein IP, LLC

(57) ABSTRACT

When a setting target apparatus accepts an instruction to start up setup software, a controller starts displaying wizard screens. The controller acquires reference information on a reference apparatus. The reference information includes an actual value and attribute information on it. The actual value is a set value actually set on the reference apparatus. The controller, using the attribute information, creates a list which lists actual values acquired in accordance with a selected category.

11 Claims, 8 Drawing Sheets

IMAGE FORMING APPARATUS AND METHOD FOR CONTROLLING SETUP INFORMATION BASED ON A REFERENCE APPARATUS

This application is based upon and claims the benefit of priority from the corresponding Japanese Patent Application No. 2019-127699 filed on Jul. 9, 2019, the entire contents of which are incorporated herein by reference.

BACKGROUND

The present disclosure relates to an image forming apparatus which performs printing.

Modern image forming apparatuses such as multifunction peripherals, printers, and copiers have multiple functions. Some functions, when used for the first time, require setup. For example, a function using a network is not available until a plurality of pieces of information such as a server name and an address are entered. A setup wizard is sometimes used to allow a user to enter set values required for using a function without omission. The setup wizard, for example, includes a plurality of setting screens. When one or a plurality of set values are entered, the next setting screen is displayed. Once entry to a series of screens is finished, entry of all the required information is completed. Using the setup wizard helps simplify setting.

There are known technologies related to the setup wizard, such as the one discussed below. Specifically, there is known a setup program which: includes a plurality of setting modules that permit processing setting required for the environment setting of a network device; makes a computer display a plurality of questions about a used function and a network environment before setup; acquires answers to the questions; selects a plurality of required setting modules in accordance with the used function and the network environment based on the acquired answers; creates a setup wizard in which a plurality of selected modules are combined together; and executes the setting modules in the created setup wizard.

Some functions in image forming apparatuses require setup when used for the first time. When, for example, a user wants to use a network transmission function, the setting related to a network is required. During setup, generally, proper setting values need to be entered for a plurality of setting items. When there is any unknown set value, a user needs to look it up or ask an administrator of the apparatus.

SUMMARY

According to one aspect of the present disclosure, an image forming apparatus includes a storage medium, a printing portion, a communication circuit, an operation panel, and a controller. The storage medium stores setup software in a non-volatile manner. The printing portion performs printing. The communication circuit communicates with a reference apparatus, which is another image forming apparatus. The operation panel displays screens and accepts settings. When the operation panel accepts an instruction to start up the setup software, the controller makes the operation panel start displaying wizard screens. The controller makes the communication circuit acquire reference information on the reference apparatus. The wizard screens are screens for sequentially and interactively setting set values for setting items which are set based on the setup software. The reference information includes actual values and attribute information on the actual values to be acquired. The actual values are the set values actually set on the reference apparatus for setting items which are set based on the setup software. The controller, using the attribute information, creates a list in which the actual values acquired in accordance with a category selected on the operation panel are listed. The controller makes the operation panel display the created list.

This and other objects of the present disclosure, and the specific benefits obtained according to the present disclosure, will become apparent from the description of embodiments which follows.

DETAILED DESCRIPTION

The object of the present disclosure is to make it possible to make a setting on an image forming apparatus easily and quickly by showing a set value applied in another image forming apparatus as a recommended set value. Now, with reference to FIGS. 1 to 11, an image forming apparatus according to an embodiment and a modified example of the present disclosure will be described. It should however be noted that all the features described in connection with the embodiment in terms of structures, arrangements, and the like are merely examples and are not meant to limit the scope of the disclosure.

(Image Forming System 100)

Figure 1:
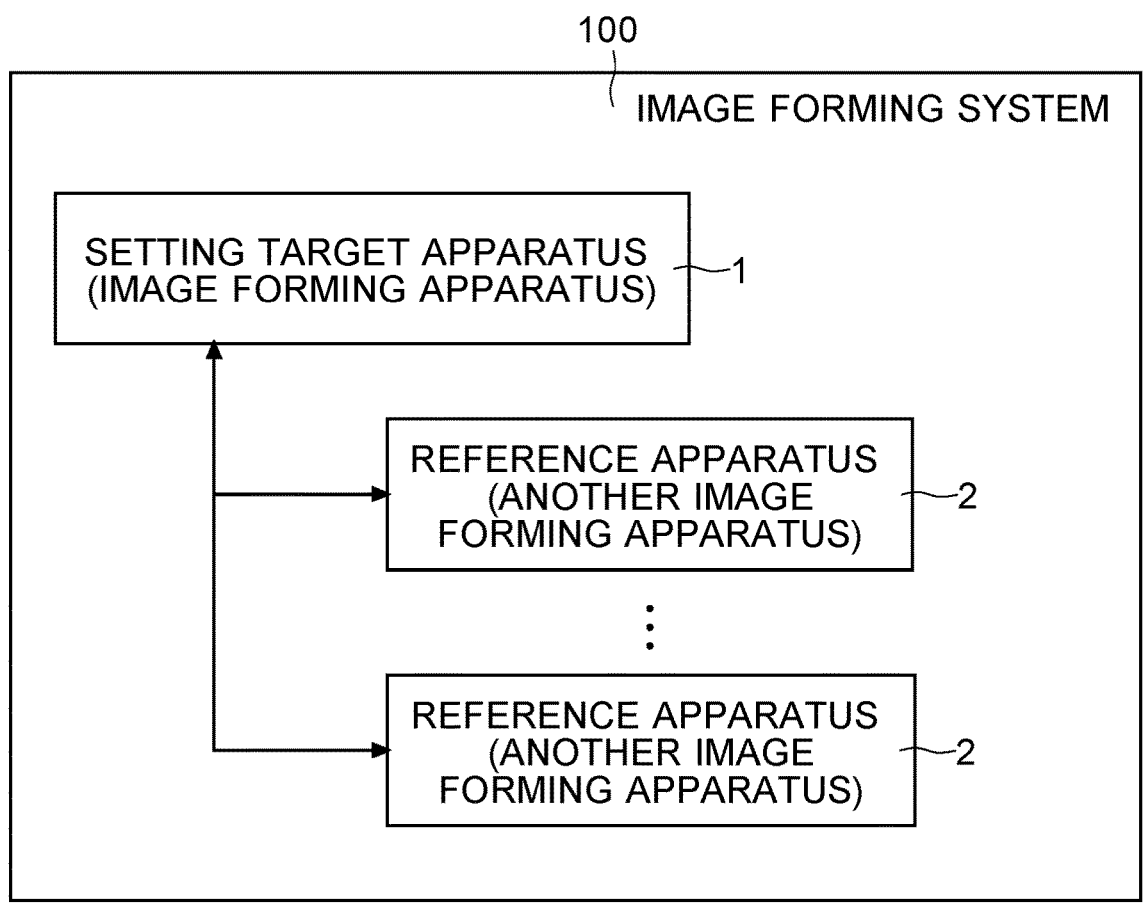
FIG. 1 is a diagram showing an outline of one example of an image forming system according to an embodiment.

First, with reference to FIG. 1, one example of an image forming system 100 according to the embodiment will be described. The image forming system 100 includes a plurality of image forming apparatuses. In the following description, of the image forming apparatuses included in the image forming system 100, an image forming apparatus of which a set value is set using setup software 5 is called the setting target apparatus 1. An image forming apparatus, other than the setting target apparatus 1, of which the set value is referred to by the setting target apparatus 1 is called the reference apparatus 2. It is possible to use the setting target apparatus 1 as the reference apparatus 2. It is also possible to use the reference apparatus 2 as the setting target apparatus 1. The setting target apparatus 1 and the reference apparatus 2 may be of the same model. The setting target apparatus 1 and the reference apparatus 2 may be of different models.

The setting target apparatus 1 and the reference apparatus 2 are communicably connected together. The setting target apparatus 1 and the reference apparatus 2 communicate with each other via a network. The setting target apparatus 1 and the reference apparatus 2 are connected to, for example, the same local area network.

(Setting Target Apparatus 1)

Next, with reference to FIG. 2, one example of the setting target apparatus 1 according to the embodiment will be described. Here, a multifunction peripheral is taken as an example of the setting target apparatus 1. The setting target apparatus 1 may be any image forming apparatus, such as a printer, other than a multifunction peripheral.

The setting target apparatus 1 includes a controller 11, a storage medium 12, an image reader 13, an operation panel 14, a printing portion 15, and a communication circuit 16. The controller 11 controls the operation of the setting target apparatus 1. The controller 11 includes a control circuit 11a, an image processing circuit 11b, and an RTC circuit 11c. The control circuit 11a performs calculation and processing related to the setting target apparatus 1. The control circuit 11a is, for example, a CPU. The image processing circuit 11b is, for example, an integrated circuit (ASIC) designed for image processing. The RTC circuit 11c is a clock circuit. The storage medium 12 stores control programs and data. The setting target apparatus 1 includes, as storage media 12, a ROM, a RAM, and a storage (for example, an HDD). Based on the programs and data in the storage medium 12, the control circuit 11a performs control and calculation related to the setting target apparatus 1.

The image reader 13 includes a document stage (contact glass). During document reading, the controller 11 makes the image reader 13 read a document set on the document stage. For document reading, the image reader 13 includes a light source (lamp), a lens, and an image sensor (line sensor). The image reader 13 generates image data of the document based on image reading by the image sensor.

The operation panel 14 includes a display panel 14a, a touch panel 14b, and hardware keys 14c. The operation panel 14 displays screens and images and accepts settings. The controller 11 controls display on a display panel 14a. The controller 11 makes the display panel 14a display operation images used for setting the system and a job. The operation images are, for example, buttons and keys. The touch panel 14b accepts user operations on the display panel 14a. Based on the output from the touch panel 14b, the controller 11 recognizes the operated operation image. Based on the operated operation image, the controller 11 recognizes user operations. Also the hardware keys 14c accept user operations.

The printing portion 15 includes a sheet feeder 15a, a sheet conveyor 15b, an image forming unit 15c, and a fixer 15d. The sheet feeder 15a includes a sheet cassette and a sheet feeding roller. A bundle of sheets is set in the sheet cassette. During a printing job, the controller 11 rotates the sheet feeding roller to feed a sheet. The sheet conveyor 15b includes a conveying roller pair and a conveying motor. The controller 11 rotates the conveying roller pair to convey a sheet to the sheet conveyor 15b.

The controller 11 makes the image forming unit 15c form a toner image based on image data. The image forming unit 15c includes an exposure device, a photosensitive drum, a charging device, a developing device, and a transfer roller.

During printing, the controller 11 rotates a main motor (unillustrated) to rotate the photosensitive drum. The controller 11 makes the charging device electrostatically charge the photosensitive drum. Based on image data, the controller 11 makes the exposure device expose the photosensitive drum to light. The exposure device exposes to light those pixels at which toner is to be attached. The developing device stores toner. The controller 11 makes a developing device develop an electrostatic latent image on the photosensitive drum with toner. The controller 11 makes a transfer roller transfer a toner image from the photosensitive drum to a sheet.

The fixer 15d includes, for example, a heater and a fixing rotary member. The controller 11 makes the fixer 15d fix the toner image transferred to the sheet. Specifically, the heater heats the fixing rotary member. The sheet to which the toner image has been transferred is heated and pressed by the fixing rotary member. The toner image is thus fixed to the sheet. The controller 11 makes the sheet conveyor 15b discharge the sheet after fixing toward the outside of the apparatus.

The communication circuit 16 includes a connector, a communication control circuit, and a communication memory. The communication memory stores communication software. The communication circuit 16 can communicate with, for example, the reference apparatus 2. The communication circuit 16 can also communicate with a computer 3 and a facsimile server 4 via a network.

(Reference Apparatus 2)

Figure 3:
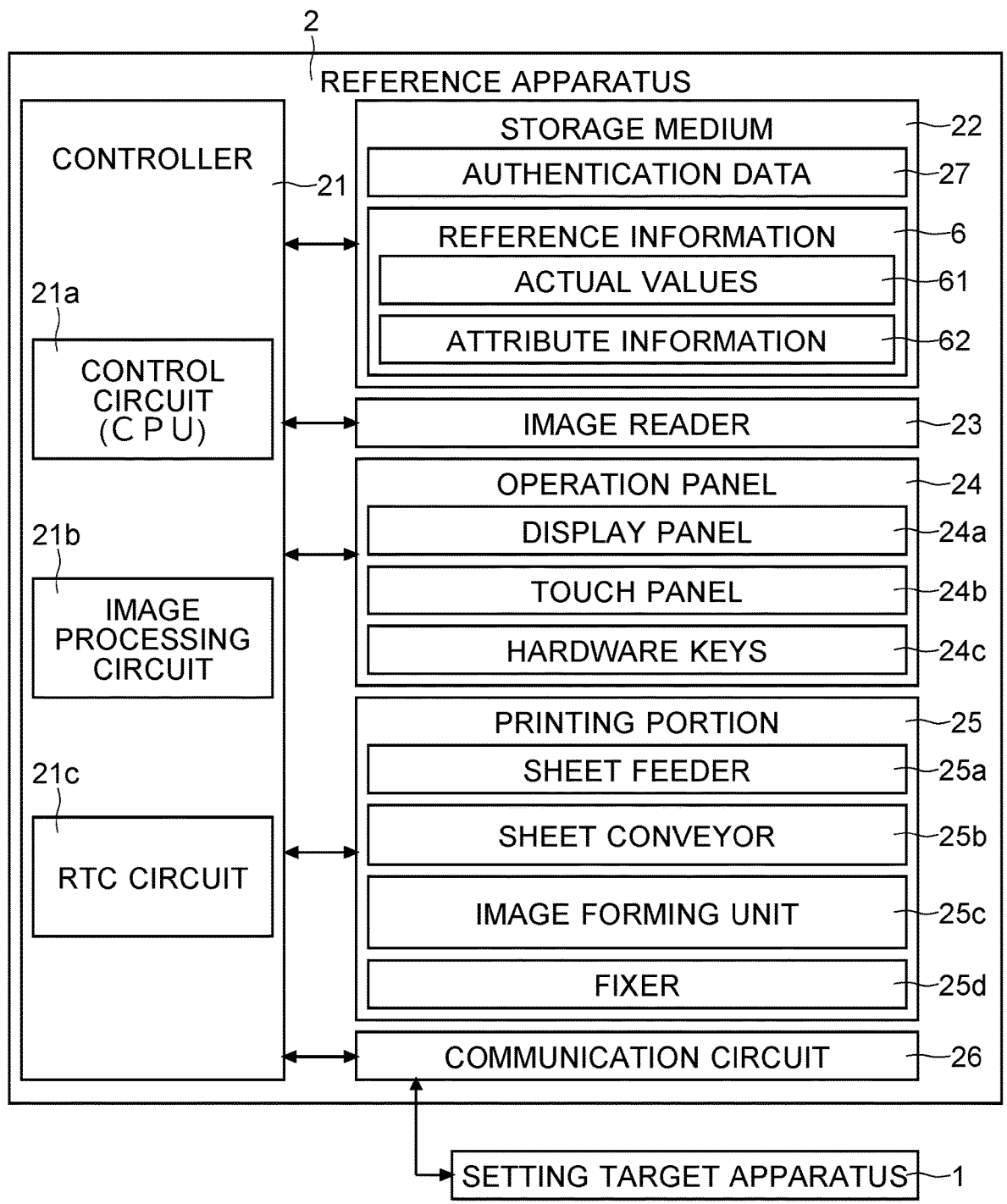
FIG. 3 is a diagram showing one example of a reference apparatus according to the embodiment.

Next, with reference to FIG. 3, one example of the reference apparatus 2 according to the embodiment will be described. The following description deals with a case where the reference apparatus 2 is a multifunction peripheral. The reference apparatus 2 may be any apparatus, such as a printer, other than a multifunction peripheral.

The reference apparatus 2 includes a controller 21, a storage medium 22, an image reader 23, an operation panel 24, a printing portion 25, and a communication circuit 26. The controller 21 controls the operation of the reference apparatus 2. The controller 21 includes a control circuit 21a, an image processing circuit 21b, and an RTC circuit 21c. The control circuit 21a is an integrated circuit for performing control and calculation related to the reference apparatus 2. The control circuit 21a is, for example, a CPU. The image processing circuit 21b is, for example, an integrated circuit (ASIC) designed for image processing. The RTC circuit 21c is a clock circuit. The storage medium 22 stores control programs and data. The reference apparatus 2 includes, as storage media 22, a ROM, a RAM, and a storage (for example, an HDD). Based on the programs and data in the storage medium 22, the control circuit 21a performs control and calculation related to the reference apparatus 2.

The storage medium 22 (storage) in the reference apparatus 2 stores set values for different setting items in a non-volatile manner. The storage medium 22 (storage) stores attribute information 62 associated with the set values. The attribute information 62 includes the setting dates and times and the names of setting persons with respect to the associated set values. Based on the output from the RTC circuit 21c, the controller 21 recognizes the setting date and time of a set value.

To set a set value on the reference apparatus 2, a setting user needs to be authenticated. The storage medium 22 stores authentication data 27. The authentication data 27 is data for authenticating a user of the reference apparatus 2. The authentication data 27 includes the user names of use-permitted persons of the reference apparatus 2. The authentication data 27 includes a password associated with each user. To set a set value, a user (setting person) enters a user name and a password on the operation panel 24. The controller 21 recognizes as the setting person the person (user) in the authentication data whose user name and password match the combination of those entered.

The image reader 23 includes a document stage (contact glass). During document reading, the controller 21 makes the image reader 23 read a document set on the document stage. The operation panel 24 includes a display panel 24a, a touch panel 24b, and hardware keys 24c. The display panel 24a displays screens and images. The controller 21 controls display on the display panel 24a. The controller 21 makes the display panel 24a display an operation image used for setting the system and a job. The operation images are, for example, buttons and keys. The touch panel 24b accepts user operations on the display panel 24a. Based on the output from the touch panel 24b, the controller 21 recognizes the operated operation image. Based on the operated operation image, the controller 21 recognizes user operations. Also the hardware keys 24c accept user operations.

The printing portion 25 includes a sheet feeder 25a, a sheet conveyor 25b, an image forming unit 25c, and a fixer 25d. The controller 21 makes the printing portion 25 print a toner image based on image data. The communication circuit 26 includes a connector, a communication control circuit, and a communication memory. The communication memory stores communication software. The communication circuit 26 can communicate with, for example, the setting target apparatus 1. The communication circuit 26 can also communicate with a computer 3 and a facsimile server 4 via a network.

(Setup on the Setting Target Apparatus 1)

Next, with reference to FIG. 2 and FIGS. 4 to 7, one example of setup on the setting target apparatus 1 according to the embodiment will be described. As shown in FIG. 2, the storage medium 12 (storage) stores setup software 5 (setup wizard software) in a non-volatile manner. In other words, the setup software 5 is installed in the storage medium 12. The setup software 5 is software for setting set values for prescribed setting items. When, for example, an image forming apparatus (setting target apparatus 1) is newly installed, the setup software 5 is executed. This allows easy setup of the setting target apparatus 1.

The storage medium 12 may store a plurality of pieces of setup software 5. Different pieces of setup software 5 are prepared for different functions. The storage medium 12 stores setup software 5, for example, for setting an e-mail transmission function, for setting a facsimile server function, and for setting a wireless communication function. To use, for example, the e-mail transmission function, a user executes the setup software 5 for setting up the e-mail transmission function and enters set values. The e-mail transmission function is then ready for use. The setting target apparatus 1 (storage medium 12) may store the setup software 5 for setting up other functions.

When the setup software 5 is executed, a plurality of wizard screens are displayed one after another. On the wizard screens, set values are set interactively (with a wizard interface) (a setup wizard). A user enters a set value on each wizard screen. The operation panel 14 accepts entry of the set values.

Next, with reference to FIGS. 4 to 7, one example of how operation proceeds when the setup software 5 is executed. The following description deals with one example of how operation proceeds when the setup software 5 for setting the facsimile server function is executed.

Figure 4:
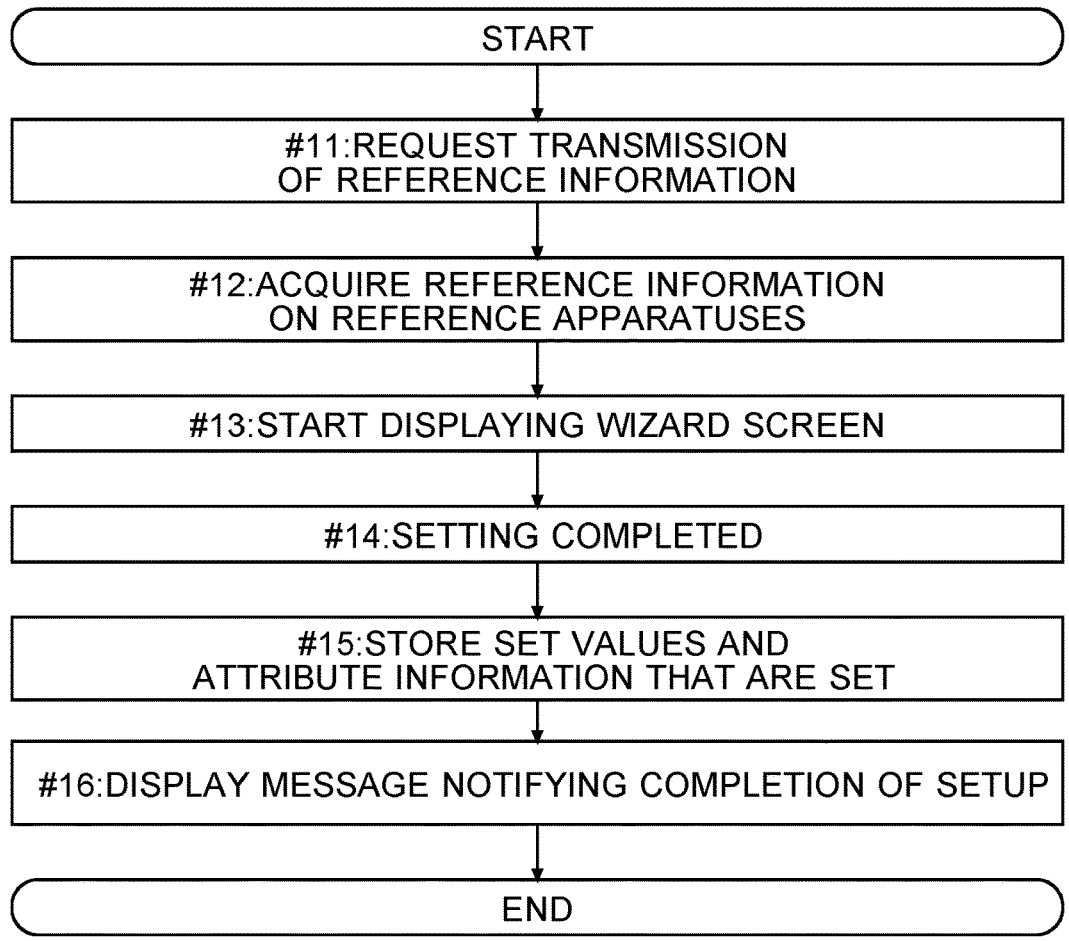
FIG. 4 is a diagram showing one example of a procedure for setup of the setting target apparatus according to the embodiment.

The procedure in FIG. 4 starts when the operation panel 14 (touch panel 14b) receives an instruction to execute the setup software 5 and the controller 11 starts processing based on the setup software 5 for which the instruction to execute has been received.

The controller 11 first makes the communication circuit 16 transmit a transmission request for reference information 6 (step #11). When a plurality of reference apparatuses 2 are connected to a local area network, the controller 11 makes the communication circuit 16 acquire the reference information 6 from a plurality of or all of the reference apparatuses 2. Specifically, the controller 11 makes the communication circuit 16 transmit to each reference apparatus 2 (communication circuit 26) a transmission request for the reference information 6. The controller 11 includes in the transmission request, for example, the names of the setting items to be set with the setup software 5 for which the instruction to execute has been received.

The reference apparatus 2 (storage medium 22) stores the reference information 6 in a non-volatile manner. The reference information 6 includes an actual value 61 and attribute information 62 on the actual value 61 to be acquired (see FIG. 3). The actual value 61 is a set value actually set on the reference apparatus 2 for a setting item that is set based on the setup software 5. The attribute information 62 is information associated with the actual value 61. In this embodiment, the attribute information 62 is, for example, the setting date and time of the actual value 61 and the name of the setting person of the actual value 61.

When the reference apparatus 2 (communication circuit 26) receives a transmission request for the reference information 6, the controller 21 of the reference apparatus 2 makes the communication circuit 26 transmit the set value (actual values 61) on the reference apparatus 2 for the requested setting item and data of the actual value 61 to which the attribute information 62 has been added. In this way, the controller 11 of the setting target apparatus 1 makes the communication circuit 16 acquire the reference information 6 on the reference apparatuses 2 (step #12).

The controller 11 of the setting target apparatus 1 makes the operation panel 14 (display panel 14a) start displaying a wizard screen (step #13). The number of pages of the wizard screen differs depending on the setup software 5. The controller 11 makes the display panel 14a sequentially display the wizard screens of the started setup software 5. Next, with reference to FIGS. 5 to 7, one example of the wizard screen when setup software 5 for the facsimile server function is executed will be described.

Figure 5:
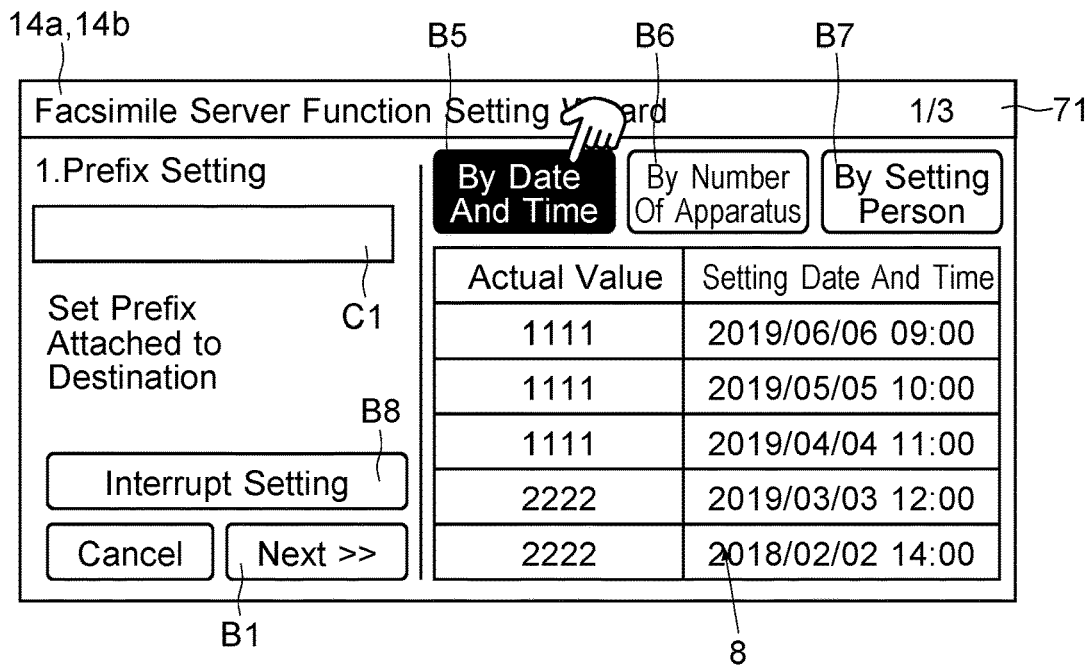
FIG. 5 is a diagram showing one example of a wizard screen according to the embodiment.
Figure 6:
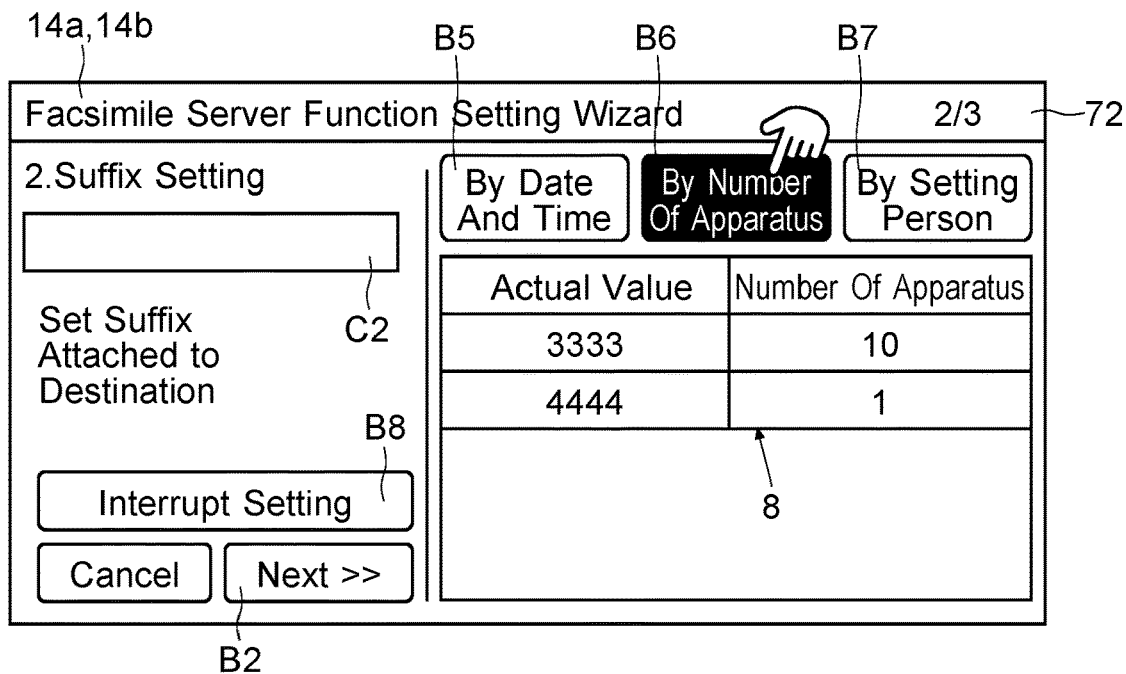
FIG. 6 is a diagram showing one example of the wizard screen according to the embodiment.
Figure 7:
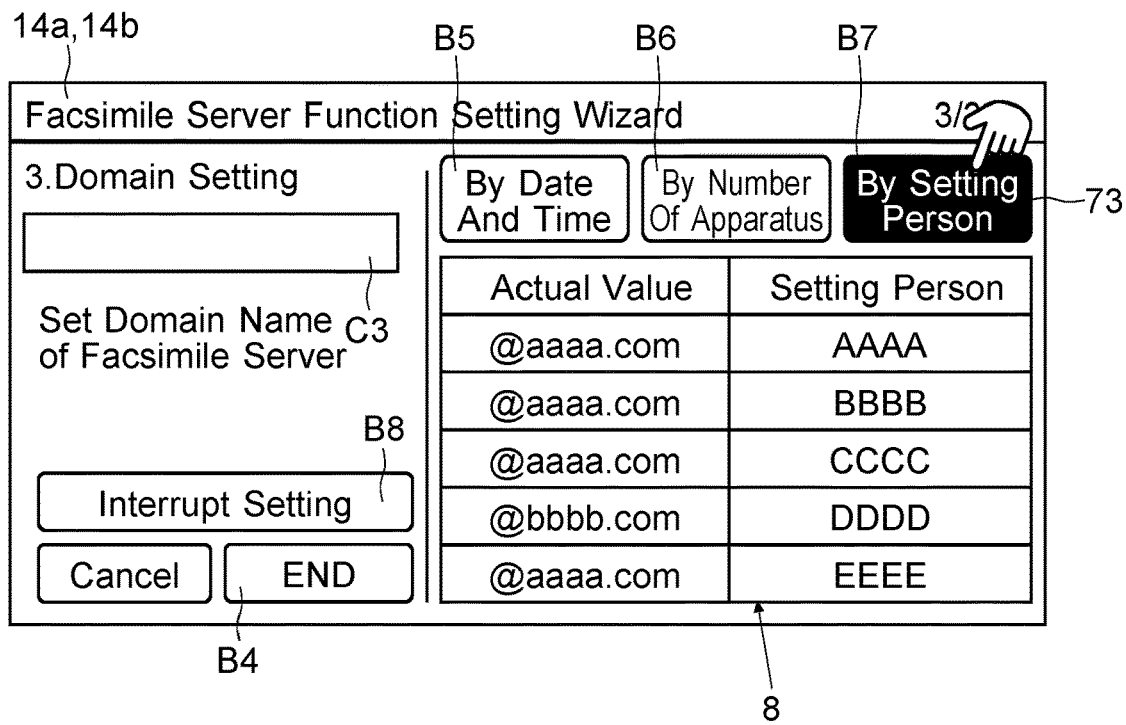
FIG. 7 is a diagram showing one example of the wizard screen according to the embodiment.

FIGS. 5 to 7 show one example of the wizard screen of the setup software 5 for setting up the facsimile server function. The controller 11 can display a list 8 on each wizard screen. The list 8 will be described in detail later.

In the examples of FIGS. 5 to 7, the controller 11 makes the display panel sequentially display three pages of wizard screens. FIG. 5 shows one example of a first wizard screen 71 (the wizard screen of page 1). FIG. 6 shows one example of a second wizard screen 72 (the wizard screen of page 2). FIG. 7 shows one example of a third wizard screen 73 (the wizard screen of page 3).

Here, the facsimile server function is a function for transmitting data via the facsimile server 4. Thus, the communication circuit 16 in the setting target apparatus 1 and the facsimile server 4 are communicably connected together (see FIG. 2). When data is transmitted to the facsimile server 4, a user sets the destination on the operation panel 14. Then, the controller 11 makes the image reader 13 read a document. The controller 11 generates an image file based on image data obtained through reading by the image reader 13. Then, the controller 11 makes the communication circuit 16 transmit to the facsimile server 4 the generated image file and destination data. The facsimile server 4 transmits the received image file to the destination that is included in the destination data.

A "prefix" is a word element that attaches to the head of a word. A prefix here is a single or a plurality of characters, numbers, symbols, or a combination of those that need to be added at the beginning of the destination when the facsimile server function is used. The prefix may be determined beforehand. In some cases, no prefix is attached.

A "suffix" is a word element that attaches to the end of a word. A suffix here is a single or a plurality of characters, numbers, symbols, or a combination of those that need to be added at the end of the destination when the facsimile server function is used. The suffix may be determined beforehand. In some cases, no suffix is attached.

Suppose that "zzzzzzzz" is set as a destination, "xxxx" is set as a prefix, and "yyyy" is set as a suffix. The controller 11 generates "xxxxzzzzzzzzyyyy" as destination data. Based on the destination data, the facsimile server 4 recognizes the necessity of transmitting the received image file and the destination to transmit it to. Even though either the destination data or the image file or both are received, if the destination data includes no proper prefix or suffix, the facsimile server 4 does not transmit the received file.

When set values for setting items that can be set using the setup software 5 are set on the reference apparatuses 2, the controller 21 of the reference apparatus 2 makes the storage medium 22 store the set values (actual values 61). The controller 21 makes the storage medium 22 store the attribute information 62 (the setting date and time and the name of the setting person of the actual value 61) in association with the actual values 61.

When the setup software 5 for the facsimile server function is executed, the controller 11 makes the display panel 14a display the first wizard screen 71 first. As shown in FIG. 5, the first wizard screen 71 is a screen for setting a prefix. That is, the setting item for the first wizard screen 71 is a prefix. On the first wizard screen 71, a prefix entry field C1 is provided. When the prefix entry field C1 is touched, the controller 11 makes the display panel 14a display a software keyboard screen. A user determines the set value for a prefix by touching the software keyboard screen. On the first wizard screen 71, a first Next button B1 is provided. When the setting of the set value for the prefix is completed, the user touches the first Next button B1. When the touch panel 14b senses the operation on the first Next button B1, the controller 11 makes the display panel 14a display the second wizard screen 72.

As shown in FIG. 6, the second wizard screen 72 is a screen for setting a suffix. That is, the setting item for the second wizard screen 72 is a suffix. On the second wizard screen 72, a suffix entry field C2 is provided. When the suffix entry field C2 is touched, the controller 11 makes the display panel 14a display a software keyboard screen. A user determines the set value for a suffix by touching the software keyboard screen. On the second wizard screen 72, a second Next button B2 is provided. When the setting of the set value for the suffix is completed, the user touches the second Next button B2. When the touch panel 14b senses the operation on the second Next button B2, the controller 11 makes the display panel 14a display the third wizard screen 73.

As shown in FIG. 7, the third wizard screen 73 is a screen for setting the domain name (address on a network) of the facsimile server 4. That is, the setting item for the third wizard screen 73 is a domain name. On the third wizard screen 73, a domain name entry field C3 is provided. When the domain name entry field C3 is touched, the controller 11 makes the display panel 14a display the software keyboard screen. A user determines the set value for a domain name by touching the software keyboard screen. On the third wizard screen 73, an End button B4 is provided. When the setting of the set value for the domain name is completed, the user touches the End button B4. Eventually, the required set values are entered on all the wizard screens and the setting is completed (step #14). When the touch panel 14b senses the operation on the End button B4, the controller 11 makes the storage medium 12 store, in a non-volatile manner, the set values and the attribute information 62 that are set (step #15). Here, the controller 11 makes the storage medium 12 store the setting date and time of the set value and information on the setting person (the attribute information 62).

Based on the output from the RTC circuit 11c, the controller 11 can recognize the date and time. To set a set value on the setting target apparatus 1, a user needs to be authenticated. The storage medium 12 stores authentication data 17 (see FIG. 2). The authentication data 17 is data for authenticating a user of the setting target apparatus 1. The authentication data 17 includes the user names of use-permitted persons of the setting target apparatus 1. The authentication data 17 includes a password associated with each user. To be authenticated (to set values), a user (setting person) enters a user name and a password on the operation panel 24. The controller 21 recognizes as the setting person the person (user) in the authentication data 17 whose user name and password match the combination of those entered. The controller 11 makes the storage medium 12 store the recognized date and time and user name in a non-volatile manner as the attribute information 62.

The controller 11, when setting of the set values for all the setting items with the setup software 5 is completed, makes the display panel 14a display a message for notifying the completion of the setup (step #16). Then, the controller 11 completes processing based on the setup software 5 (END). Setup for making one function usable on the setting target apparatus 1 is thus completed.

(Display of the List 8 on the Wizard Screen)

Next, with reference to FIGS. 5 to 8, one example of the display of the list 8 on the wizard screen according to the embodiment will be described. The setting target apparatus 1 displays the list 8 on the wizard screen. The list 8 is a table including the actual values 61 and the attribute information 62 on the reference apparatuses 2 as acquired in step #12 in FIG. 4. It is possible to make settings while referring to the actual values 61.

Here, the setting items on different wizard screens are different. Thus, the controller 11 displays a list 8 of actual values 61 for setting items to be set on the wizard screen currently being displayed. For example, in the case of the first wizard screen 71, a list 8 of prefixes that are set on the reference apparatuses 2 is displayed. In the case of the second wizard screen 72, a list 8 of suffixes that are set on the reference apparatuses 2 is displayed. In the case of the third wizard screen 73, a list 8 of domain names that are set on the reference apparatuses 2 is displayed.

The controller 11 creates a list 8 in accordance with the selected category. The category can be understood as the type of the list 8. The controller 11 arranges on each wizard screen a By-Date-and-Time button B5, a By-Number-of- Apparatus button B6, and a By-Setting-Person button B7. These three buttons are the buttons for selecting the category.

When the By-Date-and-Time button B5 is operated, the controller 11 recognizes that the category "by date and time" is selected. The operation panel 14 accepts selection of "by date and time" as the category. When the category "by date and time" is selected, the controller 11 creates a list 8 in which actual values 61 are sorted in the descending order of their setting date and time. The controller 11 creates a list 8 of actual values 61 to which the setting dates and times of the actual values 61 have been added. The controller 11 displays the created list 8 on the wizard screen.

FIG. 5 shows an example of displaying a list 8 in which actual values 61 are sorted in the descending order of the setting date and time. FIG. 5 shows a state where the By-Date-and-Time button B5 is selected. When the By-Date-and-Time button B5 is operated, a list 8 is displayed. In FIG. 5, the setting item for the first wizard screen 71 is a prefix, and thus a list of the values of prefixes that are set on the reference apparatuses 2 is displayed.

When the By-Number-of-Apparatuses button B6 is operated, the controller 11 recognizes that the category "by number of apparatuses" is selected. The operation panel 14 accepts selection of "by number of apparatuses" as the category. When the category "by number of apparatuses" is selected, the controller 11 creates a list 8 that includes actual values 61. The controller 11 creates a list 8 in which actual values 61 are sorted in the descending order of the number of apparatuses on which they are set. The controller 11 creates a list 8 that includes, for each actual value 61, the total number of the reference apparatuses 2 on which it is set. The controller 11 displays the created list 8 on the wizard screen.

FIG. 6 shows an example of displaying a list 8 in which actual values 61 are sorted in the descending order of the number of apparatuses on which they are set. FIG. 6 shows a state where the By-Number-of-Apparatuses button B6 is selected. FIG. 6 shows an example of the result when the By-Number-of-Apparatuses button B6 is operated. In FIG. 6, the setting item for the second wizard screen 72 is a suffix. FIG. 6 shows an example of displaying a list in which the values of suffixes are sorted in the descending order of the number of apparatuses on which they are set.

When the By-Setting-Person button B7 is operated, the controller 11 recognizes that the category "by setting person" is selected. The operation panel 14 thus accepts selection of "by setting person" as the category. When the category "by setting person" is selected, the controller 11 creates a list 8 in which actual values 61 are listed. The controller 11 creates a list 8 in which the setting person is added to each actual value 61. The controller 11 displays the created list 8 on the wizard screen.

FIG. 7 shows an example of displaying a list 8 in which actual values 61 and setting persons are listed side by side. FIG. 7 shows a state where the By-Setting-Person button B7 is selected. When the By-Setting-Person button B7 is operated, a list 8 is displayed. In FIG. 7, the setting item for the third wizard screen 73 is a domain name. FIG. 7 includes a list of the domain names of the facsimile servers 4 set on the reference apparatuses 2 and their setting persons.

The controller 11 creates a list 8 every time one of the By-Date-and-Time button B5, the By-Number-of-Apparatuses button B6, and the By-Setting-Person button B7 is pressed on a wizard screen. Every time one of these buttons is operated, the list 8 displayed is switched.

The operation panel 14 (touch panel 14b) accepts selection of an actual value 61 included in a list 8. For example, by long-pressing (touching longer than a given period) an actual value 61, the actual value 61 can be selected. The controller 11 recognizes the selected actual value 61. The controller 11 takes the selected actual value 61 as a set value for a setting item. The controller 11, for example, brings the entry field on a wizard screen into a state where the selected set value (actual value 61) is entered. It is possible to set a set value without operating a software keyboard screen.

Figure 8:
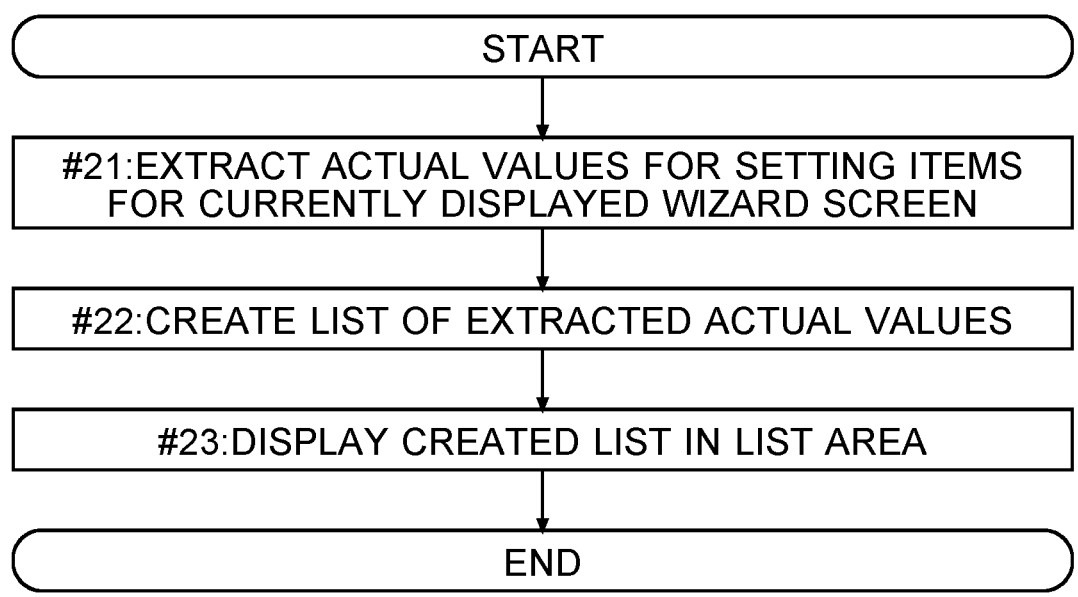
FIG. 8 is a diagram showing one example of displaying a list on the wizard screen according to the embodiment.

FIG. 8 shows an overview of the procedure of displaying the list 8. The procedure in FIG. 8 starts when one of the buttons (the By-Date-and-Time button B5, the By-Number-of-Apparatuses button B6, or the By-Setting-Person button B7) for selecting the category is operated. The controller 11 first extracts, of the actual values 61 included in the acquired reference information 6, the actual value 61 for the setting item for the wizard screen currently being displayed (step #21). The controller 11, based on the selected category and the attribute information 62 on the extracted actual value 61, creates a list 8 in which the extracted actual value 61 and information (the date and time, the number of apparatuses, or the setting person) are listed (step #22). The controller 11 displays the created list 8 in an area for displaying a list 8 on the wizard screen (step #23). Then, the controller 11 ends the procedure (END). The controller 11 continues to display the same list 8 on the wizard screen until one of the Next buttons or the End button B4 is operated, or until one of the buttons for selecting the category is operated.

(Interrupting the Setting)

Next, with reference to FIGS. 5 to 7, one example of interrupting the setting with the setup software 5 according to the embodiment will be described. In some cases, even though a list 8 is referred to, a proper set value may not be found. In this case, it is possible to interrupt the setting with the setup software 5. The controller 11 includes on each wizard screen an interrupt setting button B8 for interrupting the setting. In other words, the controller 11 displays the interrupt setting button B8 on the wizard screen. The interrupt setting button B8 is a button for terminating the setup software 5. The operation panel 14 (touch panel 14b) accepts operation (touch) on the interrupt setting button B8.

Figure 2:
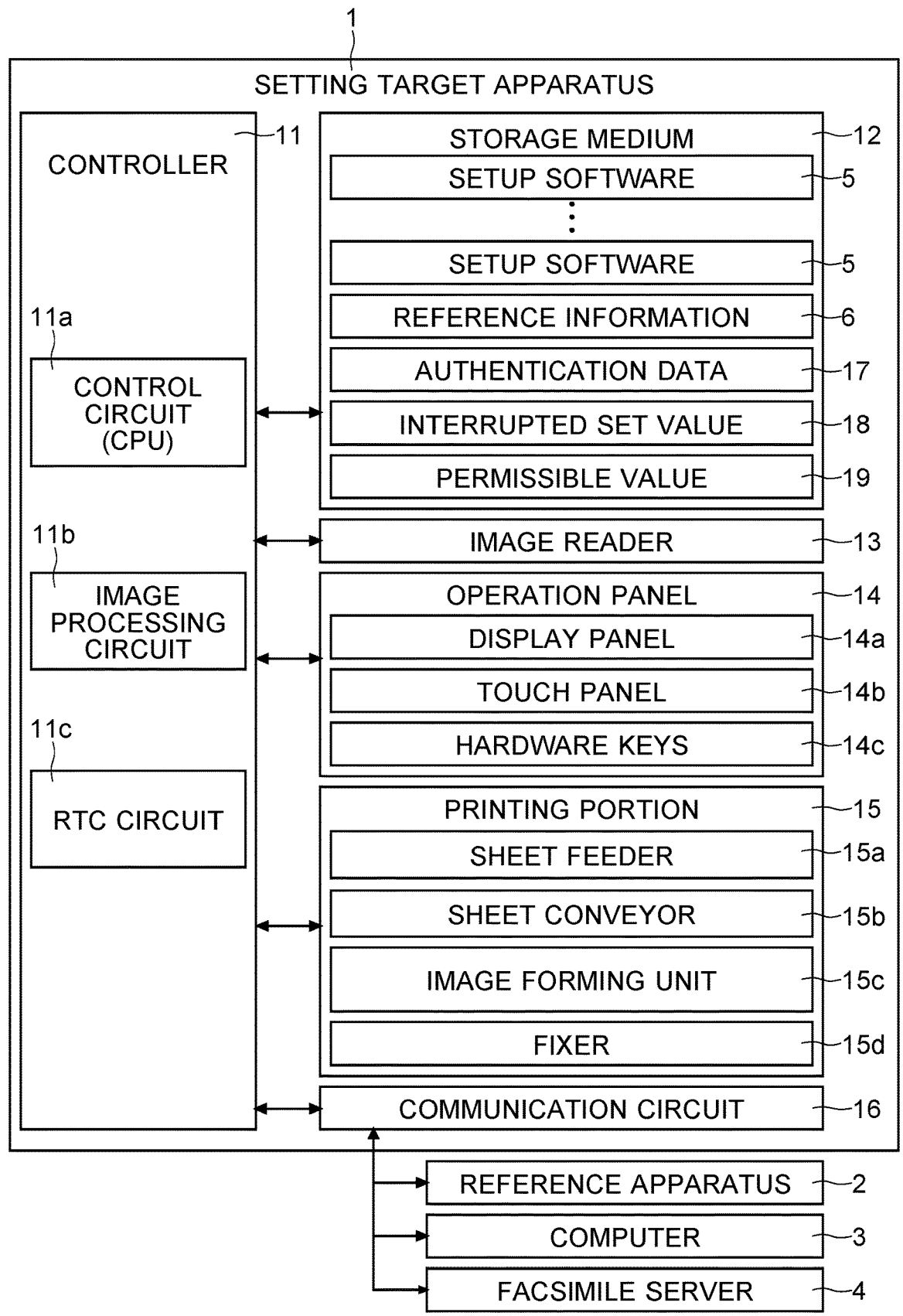
FIG. 2 is a diagram showing one example of a setting target apparatus according to the embodiment.

When the operation panel 14 accepts an operation on the interrupt setting button B8, the controller 11 makes the storage medium 12 store an interrupted set value 18 (see FIG. 2). The interrupted set value 18 is one or a plurality of set values which are set on the wizard screen after the wizard screen starts to be displayed until the interrupt setting button B8 is operated. The controller 11 stops displaying the wizard screen. The controller 11 also ends processing based on the setup software 5.

When a proper set value is found, a user restarts the setting. For restarting the setting, the user starts up the setup software 5 that has been interrupted. The operation panel 14 accepts an instruction to start the execution of the interrupted setup software 5. When an instruction is given to start up the setup software 5 for which the interrupted set value 18 is stored, the controller 11 displays the interrupted set value 18 (the set value that was set last time) on the wizard screen. That is, the setting target apparatus 1 has a resume function. This eliminates the need to enter the set value again.

(Re-Setting the Set Value)

Next, with reference to FIGS. 9 and 10, one example of re-setting a set value on the setting target apparatus 1 according to the embodiment will be described. A set value that has been set based on the setup software 5 can sometimes be inappropriate. When, for example, facsimile servers 4 are switched, the domain may be changed. An inappropriate set value may disable a function. Thus, the controller 11 of the setting target apparatus 1 monitors the changes in the actual values 61 (set values) on the reference apparatuses 2 for the setting items that are set based on the setup software 5.

For monitoring, the controller 11, after the setting based on the setup software 5, acquires the reference information 6 periodically (regularly). In other words, the controller 11 makes the communication circuit 16 periodically acquire the actual values 61 and their attribute information 62 on the reference apparatuses 2 for the setting items that are set based on the setup software 5. The acquisition cycle of the reference information 6 is prescribed. The cycle may be, for example, one day. The cycle may be several days. The cycle may be a cycle longer than several days, such as one week or one month. The operation panel 14 may accept the setting of the cycle. A user can specify the cycle with consideration given to the frequency of changes in the set value. The controller 11 makes the communication circuit 16 acquire the reference information 6 at the set cycle.

Figure 9:
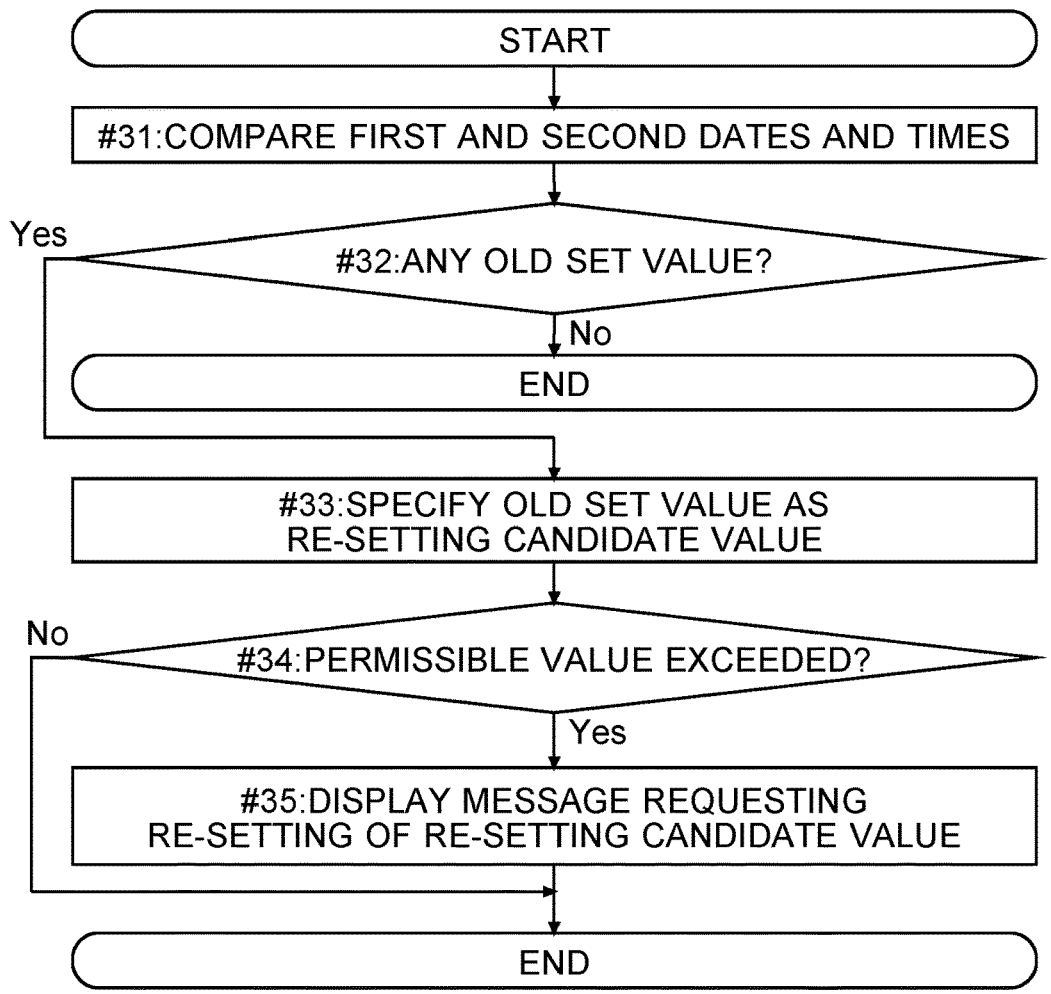
FIG. 9 is a diagram showing one example of re-setting a set value on the setting target apparatus according to the embodiment.

The procedure in FIG. 9 starts when the periodical (regular) acquisition of the reference information 6 is performed. First, the controller 11 compares a first date and time and a second date and time for the same setting item (step #31). The first date and time is the setting date and time of the current actual value 61 on another image forming apparatus (reference apparatus). The controller 11 can, based on the acquired reference information 6 (attribute information 62), recognize the first date and time of each actual value 61. The second date and time is the setting date and time of the set value on the apparatus itself (setting target apparatus 1). The storage medium 12 stores the setting date and time (second date and time), on the apparatus itself, of the set value for each setting item specified with the setup software 5.

By comparing the first and second dates and times for the same setting item, the controller 11 checks whether there is a set value of which the setting date and time is older than that on the reference apparatus 2 (step #32). When there is no old set value (No in step #32), the controller 11 ends this procedure (END). When there is an old set value (Yes in step #32), the controller 11 specifies the old set value as a re-setting candidate value (step #33).

The controller 11 checks whether there is a re-setting candidate value of which the time difference between the first and second dates and times exceeds a prescribed permissible value 19 (step #34). The controller 11 extracts, from re-setting candidate values, any which has an old setting date and time and which is likely to need correction. The permissible value 19 is specified as necessary. The permissible value 19 may be, for example, one week or one month. The operation panel 14 may accept the setting of the permissible value 19. In this case, the storage medium 12 stores the set permissible value 19 in a non-volatile manner. The controller 11 makes a judgement using the set permissible value 19.

When there is no re-setting candidate value that exceeds the permissible value 19 (No in step #34), the controller 11 ends this procedure (END). On the other hand, when there is a re-setting candidate value that exceeds the permissible value 19 (Yes in step #34), the controller 11 makes the operation panel 14 display a message screen 75 requesting the re-setting of the re-setting candidate value that exceeds the permissible value 19 (step #35). It is thus possible to notify a user that a function may be disabled and that an old set value needs to be re-set. Then, the controller 11 ends the procedure (END). Step #34 may be skipped. In this case, the controller 11 makes the operation panel 14 display a message screen 75 that requests re-setting of all the re-setting candidate values.

Figure 10:
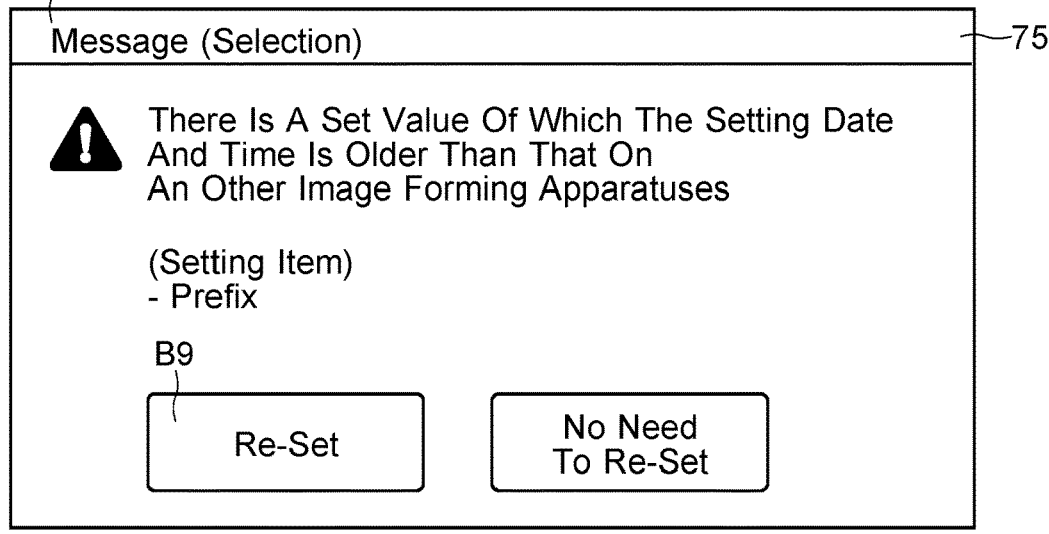
FIG. 10 is a diagram showing one example of a message screen according to the embodiment.

FIG. 10 is a diagram showing one example of the message screen 75. As shown in FIG. 10, the controller 11 displays on the message screen 75 the setting item for a set value of which the setting date and time is older than that on the reference apparatus 2. By starting up the setup software 5 for setting the setting item displayed on the message screen 75, it is possible to re-set the old set value.

As shown in FIG. 10, the controller 11 may display a Re-set button B9 on the message screen 75. The operation panel 14 accepts an operation on the Re-set button B9 as an instruction to start re-setting. Here, the controller 11 may display the wizard screen that corresponds to the setting item displayed on the message screen 75. The controller 11 may display, of the wizard screens displayed with the setup software 5, only the screen for setting the re-setting candidate value. During re-setting, the controller 11 may create a list 8 that lists the actual values 61 which are for the same setting item with the re-setting candidate value and which have the set date and time earlier than that of the re-setting candidate value. The controller 11 may display the created list 8 on the wizard screen.

As described above, the image forming apparatus (setting target apparatus 1) according to the embodiment includes a storage medium 12, a printing portion 15, a communication circuit 16, an operation panel 14, and a controller 11. The storage medium 12 stores the setup software 5 in a non-volatile manner. The printing portion 15 performs printing. The communication circuit 16 communicates with the reference apparatus 2, which is another image forming apparatus. The operation panel 14 displays screens and accepts settings. When the operation panel 14 accepts an instruction to start up the setup software 5, the controller 11 makes the operation panel 14 start displaying the wizard screen. The controller 11 makes the communication circuit 16 acquire the reference information 6 on the reference apparatus 2. The wizard screens are screens for sequentially and interactively setting set values for the setting items that are set based on the setup software 5. The reference information 6 includes an actual value 61 and the attribute information 62 on the actual value 61 to be acquired. The actual value 61 is a set value actually set on the reference apparatus 2 for a setting item that is set based on the setup software 5. The controller 11, using the attribute information 62, creates a list 8 in which the actual values 61 acquired in accordance with the category selected on the operation panel 14 are listed. The controller 11 makes the operation panel 14 display the created list 8.

There are setting items for which the set values are equal among a plurality of image forming apparatuses (for example, the address of a transmission server). According to the present disclosure, the value that is actually used on the reference apparatus 2 (another image forming apparatus) can be displayed as an example. A user making a setting can, during the setup, refer to the set value which is actually used on the reference apparatus 2 and which has a high probability of being appropriate (a recommended set value). By quoting the actual value 61, trouble and time required for finding a proper set value can be spared. This makes it possible to continue the setup software 5 without interruption. This also helps complete setting on the image forming apparatus easily and quickly. It is thus possible to provide an image forming apparatus which allows simple setting and thus is easy to use.

The communication circuit 16 acquires the setting date and time of the actual value 61 as the attribute information 62. When the operation panel 14 accepts the selection of "by date and time" as the category, the controller 11 creates a list 8 in which the actual values 61 for the setting items that are set on the wizard screen being displayed are sorted in the descending order of their setting date and time. The set values on the image forming apparatus are sometimes changed according to the installation environment. In some cases, of the actual values 61, the newer is more appropriate as a set value. According to the present disclosure, it is possible to show a user making a setting the actual values 61 in the descending order of their setting date and time. It is possible to display a list 8 that helps a user narrow down the actual value 61 to be used. A user can select the category to see a list 8 with the desired content.

When the operation panel 14 accepts the selection of "by number of apparatuses" as the category, the controller 11 creates a list 8 in which actual values 61 for the setting items that are set on the wizard screen being displayed are sorted in the descending order of the number of apparatuses on which they are set. In some cases, of the actual values 61, the one that is frequently used is appropriate as a set value. It is possible to show the user making a setting the actual values 61 in the descending order of the number of apparatuses on which they are set. According to the present disclosure, it is possible to display a list 8 that helps a user narrow down the actual value 61 to be used. A user can select the category to see a list 8 with the desired content.

The communication circuit 16 acquires the setting person of the actual value 61 as the attribute information 62. When the operation panel 14 accepts the selection of "by setting person" as the category, the controller 11 creates a list 8 in which actual values 61 for the setting items that are set on the wizard screen being displayed are listed and the setting person is added to each of the listed actual values 61. Some users may want to select a value to be quoted as a proper set value based on the setting person of the actual value 61. According to the present disclosure, it is possible to display the setting persons of actual values 61. It is possible to display a list 8 that helps a user narrow down the actual value 61 to be used. A user can select the category to view the list 8 with the desired content.

When the operation panel 14 accepts selection of an actual value 61 included in the list 8, the controller 11 makes the storage medium 12 store the selected actual value 61 as a set value for a setting item. It is possible to take, of the actual values 61 in the list 8, the selected actual value 61 as the set value for the setting item in the setup software 5.

The storage medium 12 stores the setting date and time on the apparatus itself for each set value. After a set value is set based on the setup software 5, the controller 11 makes the communication circuit 16 acquire the reference information 6 on the reference apparatuses 2 regularly. The controller 11 compares, for the same setting item, the first date and time, which is the setting date and time of the current actual value 61, with the second date and time, which is the setting date and time of a set value on the apparatus itself, to recognize a re-setting candidate value of which the setting date and time is older than that of the set value on the reference apparatus 2. The controller 11 makes the operation panel 14 display a message screen 75 that requests re-setting of the re-setting candidate values. It is possible to judge whether the set value on the apparatus itself is older than the value set on another image forming apparatus. It is possible to request the re-setting of an old set value (re-setting candidate value). It is possible to keep the set value on the image forming apparatus at an appropriate value in accordance with the installation environment. It is possible to prevent a function from being disabled due to an inappropriate set value.

The controller 11 makes the operation panel 14 display a message screen 75 requesting the re-resetting of only the re-setting candidate value of which the time difference between the first and second dates and times exceeds a prescribed permissible value 19. It is possible to display a message screen 75 only for the re-setting candidate values of which the setting date and time is widely different from that on other image forming apparatuses. It is possible to display a message screen 75 requesting the re-setting of the set value which is too old and is likely to be inappropriate.

When the operation panel 14 accepts an instruction to start the re-setting based on the message screen 75, the controller 11 creates a wizard screen for re-setting the re-setting candidate value and a list 8 which lists the actual values 61 that are for the same setting item as the re-setting candidate value and that have the setting date and time earlier than that of the re-setting candidate value. The controller 11 makes the operation panel 14 display the created list 8. This makes it possible to re-set the re-setting candidate value easily. It is possible to re-set the re-setting candidate value while referring to the actual values 61 on other image forming apparatuses.

The controller 11 makes the storage medium 12 store the set value for the setting item that is set based on the setup software 5 and the attribute information 62 on the set value that is set. The controller 11 makes the storage medium 12 store the setting date and time of the set value and information on the setting person as the attribute information 62 on the set value. It is possible to make the setting target apparatus 1 store the set value and its attribute information 62 so that those can be used in other image forming apparatuses.

Modified Example

Figure 11:
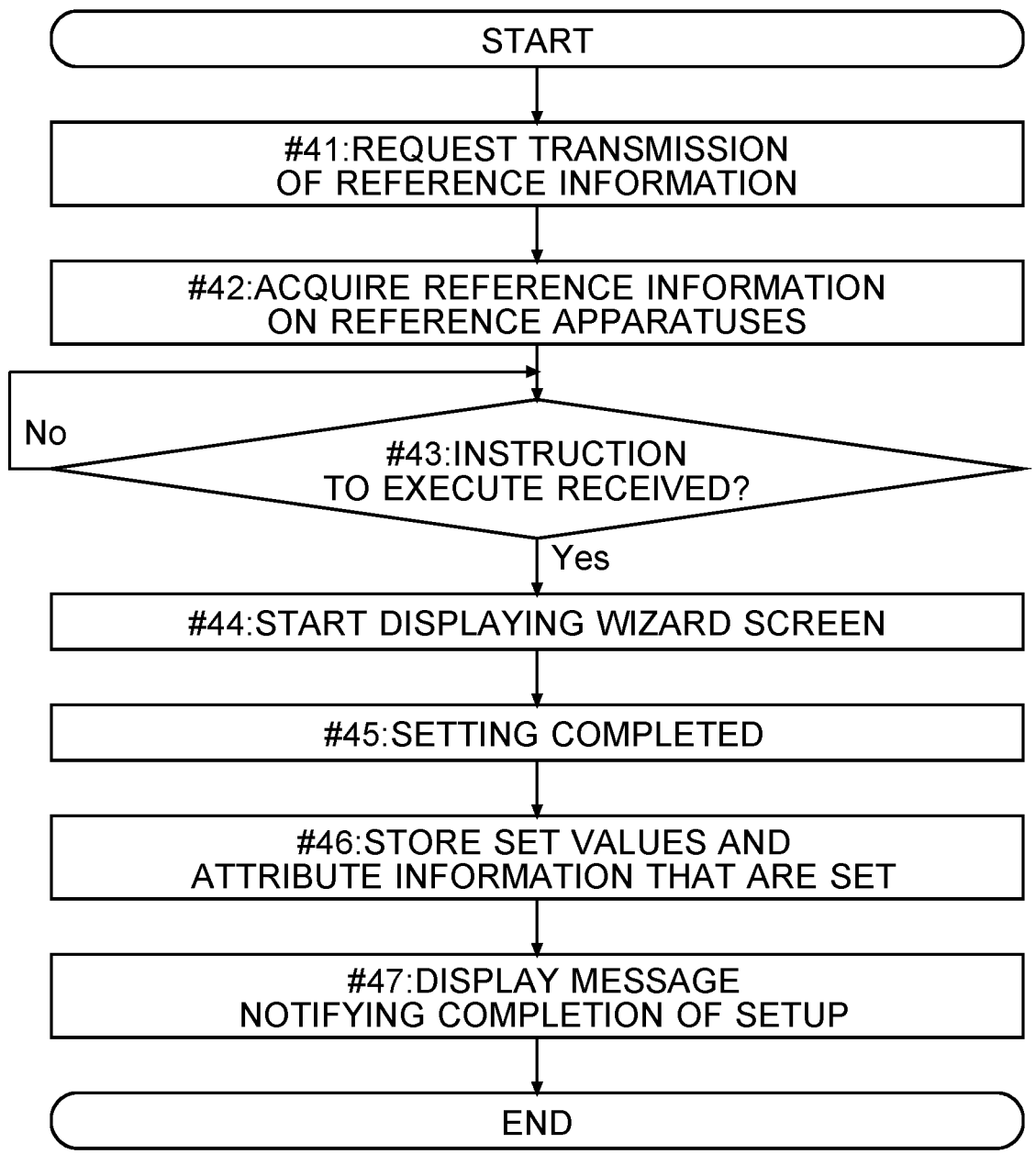
FIG. 11 is a diagram showing one example of a procedure for setup of the setting target apparatus according to the embodiment.

With reference to FIG. 11, one example of an image forming apparatus (setting target apparatus 1) according to a modified example will be described. The embodiment described above deals with an example where, when the setup software 5 is started up, the controller 11 collects (makes the communication circuit 16 acquire) the reference information 6. In the modified example, merely starting up the setup software 5 does not lead to collecting the reference information 6. In the modified example, the controller 11 collects the reference information 6 in response to, as a trigger, the controller 11 making the storage medium 12 store the interrupted set value 18 as a result of the operation on the interrupt setting button B8. Thus, the procedure in FIG. 11 starts when the controller 11 makes the storage medium 12 store the interrupted set value 18. Here, the setting target apparatus 1 according to the modified example is the same as the setting target apparatus 1 according to the embodiment except for differences in the time point of collecting the reference information 6 and the time point of displaying the list 8.

The controller 11 makes the communication circuit 16 transmit a transmission request for reference information 6 (step #41). The controller 11 acquires the actual value 61 for the setting item in the interrupted setup software 5 from the reference apparatus 2. Thus, in the modified example, the time point of collecting the reference information 6 is different. When it is recognized that the setting person has interrupted the setting because the proper set value is unknown, the controller 11 acquires the actual value 61.

The controller 21 of the reference apparatus 2 makes the communication circuit 26 transmit the set value (actual value 61) on the reference apparatus 2 for the requested setting item and data of the actual value 61 to which the attribute information 62 has been added. The controller 11 of the setting target apparatus 1 makes the communication circuit 16 acquire the reference information 6 on the reference apparatuses 2 (step #42).

The controller 11 of the setting target apparatus 1 continues to check whether the operation panel 14 (touch panel 14b) has accepted an instruction to execute the setup software 5 (step #43, and if No in step #43, then step #43 again). The controller 11 waits for an instruction to execute the setup software 5 for which the interrupted set value 18 is stored (which has been interrupted). The controller 11 monitors the restarting of the setting that has been interrupted.

When the operation panel 14 (touch panel 14b) accepts an instruction to execute the setup software 5 for which the interrupted set value 18 is stored, the controller 11 makes the operation panel 14 (display panel 14a) start displaying the wizard screen of the setup software 5 (step #44). When the setup software 5 which has been interrupted and for which the interrupted set value 18 is stored is executed, the controller 11 displays on the wizard screen the interrupted set value 18 that has been set previously.

The controller 11 also displays a list 8 on the wizard screen based on the reference information 6 acquired in step #42. A user can make a setting with reference to the actual values 61. In the modified example, when no interrupted set value 18 is stored yet, the controller 11 does not display a list 8 on the wizard screen. When no interrupted set value 18 is stored yet, the controller 11 displays, for example, detailed description texts for setting items in an area for displaying the list 8.

When the interrupted set value 18 has been stored in the storage medium 12, as shown in FIGS. 5 to 7, the controller 11 displays a list 8 on the wizard screen. Some users who are experienced in setting may need no information on the list 8. When a user interrupts setting and there is a high probability that the user is not experienced in setting, reference information 6 is collected and a list 8 is displayed. This makes it possible to support inexperienced users.

Eventually, the required set values are entered on all the wizard screens and the setting is completed (step #45). When the touch panel 14b senses the operation on the End button B4, the controller 11 makes the storage medium 12 store, in a non-volatile manner, the set values and the attribute information 62 that are set (step #46). Here, the controller 11 makes the storage medium 12 store the setting date and time of the set value and information on the setting person (the attribute information 62). Then, the controller 11 makes the display panel 14a display a message notifying the completion of the setup (step #47). The controller 11, when the setting of the set values for all the setting items with the setup software 5 is completed, finishes processing based on the setup software 5 (End).

The image forming apparatus (setting target apparatus 1) according to the modified example includes a storage medium 12, a printing portion 15, a communication circuit 16, an operation panel 14, and a controller 11. The storage medium 12 stores the setup software 5 in a non-volatile manner. The printing portion 15 performs printing. The communication circuit 16 communicates with the reference apparatus 2, which is another image forming apparatus. The operation panel 14 displays screens and accepts settings.

When the operation panel 14 accepts an instruction to start up the setup software 5, the controller 11 makes the operation panel 14 start displaying the wizard screens. The wizard screens are screens for sequentially and interactively setting the set values for the setting items that are set based on the setup software 5. The controller 11 displays the interrupt setting button B8 on the wizard screen. When the operation panel 14 accepts the operation on the interrupt setting button B8, the controller 11 stops displaying the wizard screens and makes the storage medium 12 store the interrupted set value 18, which is the set value that has been set on the wizard screen before the interrupt setting button B8 is operated. When storing the interrupted set value 18, the controller 11 makes the communication circuit 16 acquire the reference information 6 on the reference apparatus 2. The reference information 6 includes an actual value 61 and the attribute information 62 on the actual value 61 to be acquired. The actual value 61 is a set value that is set on the reference apparatus 2 for a setting item that is set based on the setup software 5. When the operation panel 14 accepts a new instruction to start the setup software 5 for which the interrupted set value 18 is stored, the controller 11 displays the interrupted set value 18 on the wizard screen. According to the category selected on the operation panel 14, the controller 11, using the acquired attribute information 62, creates a list 8 in which the acquired actual values 61 are listed. The controller 11 makes the operation panel 14 display the created list 8.

When the setting with the setup software 5 is interrupted, it is possible to store the entered setting value. When the interrupted setup software 5 is restarted, the entered set value is reflected. Only when the setup software 5 is restarted, a value (set value) that is actually used on the reference apparatus 2 (another image forming apparatus) can be displayed as an example. A user making a setting can refer to, in the setup software 5, a recommended set value which is actually used on the reference apparatus 2 and which has a high probability of being appropriate.

The embodiments and modified examples of the present disclosure have been described. The embodiments described above are in no way meant to limit the present disclosure, which thus allow for many modifications and variations within the spirit of the present disclosure.

What is claimed is:
1. An image forming apparatus, comprising:
   a storage medium which stores setup software in a non-volatile manner;
   a communication circuit which communicates with a reference apparatus, which is another image forming apparatus;
   an operation panel which displays a screen and accepts setting; and
   a controller, wherein when the operation panel accepts an instruction to execute the setup software, the controller makes the operation panel start displaying a wizard screen, and
   makes the communication circuit acquire reference information on the reference apparatus,
   the displayed wizard screen comprises a plurality of screens for sequentially and interactively setting set values for setting items which are set based on the executed setup software,
   the acquired reference information includes actual values and attribute information on the actual values to be acquired, the actual values are set values actually set on the reference apparatus for the setting items which are set based on the executed setup software, and the controller using the attribute information, creates a list in which the actual values acquired in accordance with a category selected on the operation panel are listed, and makes the operation panel display the created list.

2. The image forming apparatus according to claim 1, wherein the communication circuit acquires setting dates and times of the actual values as the attribute information, and when the operation panel accepts selection of "by date and time" as the category, the controller creates a list in which the actual values for the setting items which are set on the displayed wizard screen are sorted in descending order of setting dates and times thereof.

3. The image forming apparatus according to claim 1, wherein when the operation panel accepts selection of "by number of apparatuses" as the category, the controller creates a list in which actual values for the setting items which are set on the displayed wizard screen are sorted in descending order of numbers of apparatuses on which they are set.

4. The image forming apparatus according to claim 1, wherein the communication circuit acquires setting persons of the actual values as the attribute information, and when the operation panel accepts selection of "by setting person" as the category, the controller creates a list in which the actual values for the setting items which are set on the displayed wizard screen are listed and the setting persons are added to the listed actual values respectively.

5. The image forming apparatus according to claim 1, wherein when the operation panel accepts selection of the actual value included in the list, the controller makes the storage medium store the selected actual value as a set value for a setting item.

6. The image forming apparatus according to claim 1, wherein the storage medium stores a setting date and time on the apparatus itself for each set value, and after the set value is set based on the executed setup software, the controller makes the communication circuit regularly acquire the reference information on the reference apparatus, compares, for a same setting item, a first date and time, which is a setting date and time of a current actual value, with a second date and time, which is a setting date and time of the set value on the apparatus itself, to recognize a re-setting candidate value of which the setting date and time is older than the setting date and time of the set value on the reference apparatus, and makes the operation panel display a message screen requesting re-setting of the re-setting candidate value.

7. The image forming apparatus according to claim 6, wherein the controller makes the operation panel display the message screen requesting the re-setting of only a re-setting candidate value for which a time difference between the first and second dates and times exceeds a prescribed permissible value.

8. The image forming apparatus according to claim 6, wherein when the operation panel accepts an instruction to start re-setting based on the message screen, the controller creates a wizard screen for re-setting the re-setting candidate value and a list which lists the actual values which are for a same setting item as the re-setting candidate value and which have a setting date and time earlier than the setting date and time of the re-setting candidate value, and makes the operation panel display the created list.

9. The image forming apparatus according to claim 1, wherein the controller makes the storage medium store the set values for the setting items which are set based on the executed setup software and the attribute information on the set values which are set, and makes the storage medium store setting dates and times of the set values and information on setting persons as the attribute information on the set value.

10. An image forming apparatus, comprising:

a storage medium which stores setup software in a non-volatile manner;

a communication circuit which communicates with a reference apparatus, which is another image forming apparatus;

an operation panel which displays a screen and accepts setting; and a controller, wherein when the operation panel accepts an instruction to execute the setup software, the controller makes the operation panel start displaying a wizard screen, the displayed wizard screen comprises a plurality of screens for sequentially and interactively setting set values for setting items which are set based on the executed setup software, the controller displays an interrupt setting button on the displayed wizard screen, when the operation panel accepts operation on the interrupt setting button, stops displaying the displayed wizard screen and makes the storage medium store an interrupted set value, which is the set value which has been set on the displayed wizard screen before the interrupt setting button is operated, and when storing the interrupted set value, makes the communication circuit acquire reference information on the reference apparatus, the acquired reference information includes actual values and attribute information on the actual values to be acquired, the actual values are set values for setting items which are set based on the executed setup software, and are the set values which are set on the reference apparatus, and when the operation panel accepts an instruction to execute the setup software for which the interrupted set value is stored, the controller displays the interrupted set value on the displayed wizard screen, according to a category selected on the operation panel, using the acquired attribute information, creates a list in which the acquired actual values are listed, and makes the operation panel display the created list.

11. A method for controlling an image forming apparatus, the method comprising:

storing setup software in a non-volatile manner;

communicating with a reference apparatus, which is another image forming apparatus;

displaying a screen and accepting a setting; when an operation panel accepts an instruction to execute the setup software, making the operation panel start displaying a wizard screen;

acquiring reference information on the reference apparatus through communication; the displayed wizard screens comprising a plurality of screens for sequentially and interactively setting set values for setting items which are set based on the executed setup software;

the acquired reference information including actual values and attribute information on the actual values to be acquired; the actual values being set values actually set on the reference apparatus for setting items which are set based on the executed setup software;

creating a list in which the actual values acquired in accordance with a category selected on the operation panel are listed using the attribute information; and displaying the created list.

* * * * *